United States Patent
Nagy et al.

(10) Patent No.: US 10,972,027 B2
(45) Date of Patent: Apr. 6, 2021

(54) DC ELECTRIC MOTOR WITH ASYMMETRICAL STATOR INDUCTORS

(71) Applicant: The Swatch Group Research and Development Ltd, Marin (CH)

(72) Inventors: Laurent Nagy, Liebefeld (CH); Christophe Germiquet, Preles (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/671,381

(22) Filed: Nov. 1, 2019

(65) Prior Publication Data

US 2020/0186064 A1    Jun. 11, 2020

(30) Foreign Application Priority Data

Dec. 6, 2018 (EP) ..................................... 18210866

(51) Int. Cl.
  *H02P 6/182* (2016.01)
  *H02P 7/291* (2016.01)
  *G04C 3/16* (2006.01)

(52) U.S. Cl.
  CPC ............... *H02P 7/291* (2016.02); *G04C 3/16* (2013.01)

(58) Field of Classification Search
  CPC ............ H02P 7/291; H02P 6/182; G04C 3/16
  See application file for complete search history.

(56) References Cited

U.S. PATENT DOCUMENTS

| 4,446,413 A | 5/1984 | Remus et al. |
| 4,568,867 A | 2/1986 | Remus et al. |
| 6,034,502 A | 3/2000 | Buehler |
| 2010/0007297 A1* | 1/2010 | Brown .................... H02P 6/182 318/400.32 |

OTHER PUBLICATIONS

European Search Report dated Jun. 11, 2019 in European Application 18210866.2 filed on Dec. 6, 2018.

* cited by examiner

*Primary Examiner* — Cortez M Cook
(74) *Attorney, Agent, or Firm* — Oblon, McClelland, Maier & Neustadt, L.L.P.

(57) ABSTRACT

A DC motor including a continuous rotation rotor; a first inductor characterized by first parameters; a second inductor characterized by second parameters; a voltage supply unit; a measurement unit for detecting time instants when a first induced voltage in the first inductor equals a second induced voltage in the second inductor; and a control unit for controlling the application of drive voltage pulses to the inductors. The rotor faces first the second inductor before facing the first inductor when being rotated. At least one of the second parameters is selected different from a corresponding parameter of the first parameters such that a maximum induced voltage in the first inductor is greater than a maximum induced voltage in the second inductor. The control unit is arranged to trigger each of the drive voltage pulses after a detection of an equal induced voltage in the first and second inductors.

15 Claims, 4 Drawing Sheets

DC ELECTRIC MOTOR WITH ASYMMETRICAL STATOR INDUCTORS

CROSS-REFERENCE TO RELATED APPLICATION

This application claims priority to European Patent Application No. 18210866.2 filed on Dec. 6, 2018, the entire disclosure of which is hereby incorporated herein by reference.

TECHNICAL FIELD

The present invention relates to a direct current (DC) electric motor comprising two circular coils of relatively small thickness (i.e. disc-shaped coils) as stator inductors. The proposed motor may have small dimensions making it suitable for horological applications and more specifically for electromechanical watch movements.

BACKGROUND OF THE INVENTION

DC electric motors are well known and have been around for quite a long time. These motors convert electrical energy into mechanical energy for many types of applications. Electromechanical mobile devices, such as electromechanical wristwatches, often comprise a DC motor and are powered by DC sources, such as batteries. One example of a DC motor is a permanent magnet DC motor. This kind of DC motor has no brushes and has typically permanent magnets on the rotor. The stator comprises coils, which typically do not move. This kind of electric motor allows for smaller design and results in reduced power consumption.

In horological applications, stepper motors are generally used. Specific commands generate drive electrical pulses, which make the rotor advance step by step. Stepper motors are brushless DC motors, which divide a full rotation into a number of equal steps. The stator defines stable positions for the rotor with permanent magnets. There are typically two or three stable positions per one full rotation of 360 degrees. To be able to generate the pulses, a sufficient voltage level is needed. Voltage supplies used in these motors, especially when used in electromechanical watches, typically generate a voltage level between 1.2 V and 1.5 V. Consequently, batteries available for these applications supply a voltage in this range of values. Continuous rotation DC electric motors have the advantage over stepper motors that when used in horological applications, the watch hands can be rotated continuously. This makes the operation of these watches similar to mechanical watches. In this manner noise caused by the steps of the rotor, which could be disturbing in particular at night time, can be avoided.

A DC motor is controlled by a motor drive unit. The drive units are typically arranged to alternate the current that travels in the stator coils and thus the direction of the magnetic flux lines which are coupled to the magnet(s) of the rotor. An H-bridge circuit is an example implementation of a motor drive unit. The term H-bridge is derived from the typical graphical representation of this kind of circuit comprising four switches arranged between a supply voltage node and ground. By opening and closing these switches in a desired manner, a positive or negative voltage can be selectively applied to the inductor circuit of the motor. In other words, by manipulating the four switches depending on the position of the rotor or more specifically on the rotor magnets, a current can be arranged to travel through the stator coils selectively in a first direction, and in a second, opposite direction.

An example DC motor arrangement is schematically illustrated in FIG. 1. The simplified motor 1 of FIG. 1 comprises a rotor 3, with permanent bipolar magnets 3b arranged on two ferromagnetic discs 3a (these magnets having an axial polarisation and alternate polarities), and a stator formed by a first stator inductor A and a second stator inductor B. A motor drive or control unit 5 is configured to adjust the current through the coils. A digital control unit 7 is in turn configured to control the operation of the motor drive unit based on a detected operation of the rotor. For instance, if the control unit 7 detects that the rotor is spinning too fast, it can order the motor drive unit 5 to slow down the rotor 3. The motor drive unit is also provided with a voltage supply unit 9, such as a battery. There is further shown a measurement unit 11 for taking measurements relating to the operation of the motor.

SUMMARY OF THE INVENTION

Joule heating, also known as Ohmic or resistive heating, is the process by which the passage of an electric current through a conductor produces heat. Joule's first law states that the power of heating $P_j$ generated by an electrical conductor is proportional to the product of its resistance R and the square of the current I: $P_j=R \times I^2$. However, the useful mechanical power $P_{mec}$ is proportional to the current, but not to its square: $P_{mec}=k_u \times w \times I$, where $k_u$ is the torque constant and w the rotational speed of the rotor. Thus, it becomes clear that in order to minimise the resistive heating losses, the supply current should be kept as low as possible while however keeping the motor torque sufficiently high for driving the motor, and more specifically its rotor.

The resistive heating losses can be reduced if a voltage pulse generated by the motor drive unit for the stator coils is generated when the sum of the induced voltages in the stator coils is at its maximum value. By 'induced voltage in/of a coil or across an inductor circuit' it is understood the induced voltage (caused by the rotation or turning of the rotor) between the two terminals of the coil or of the inductor circuit. Assuming that the voltage supply, provided to the two stator coils arranged in series, is sufficient for driving the rotor at its nominal speed with a useful voltage corresponding to the difference between the voltage supply and the maximum value of the sum of the induced voltages in the two stator coils, then the ideal situation for driving a motor having two identical coils (i.e. having same parameters, in particular same dimensions and arranged at an equal distance from the rotation axis of the rotor, as would be selected by a person skilled in the art) is illustrated in FIG. 2. The thick solid line indicates the induced voltage in the first inductor A and the thin solid line indicates the induced voltage in the second inductor B. The dashed line indicates the sum of the induced voltages in the first and second coils A, B, while the dashed step shape indicates the drive voltage pulses generated by the motor drive unit. As shown, the ideal situation occurs when each drive voltage pulse is centred at an absolute maximum of the sum of the two induced voltages. However, it is not easy with low consumption control circuits to obtain such optimal drive pulses.

A preferred control method of a motor of the type of FIG. 1 consists, within the frame of the present invention, in detecting the crossing of the two induced voltages and in triggering the drive voltage pulses by this crossing detection. With such a preferred control method, the generated drive voltage pulses are no longer centred at absolute maxima of the sum of the induced voltages, as illustrated in FIG. 3. Compared to the situation of FIG. 2, the difference between the supply voltage and the average of the sum of the induced voltage over the duration of a drive voltage pulse is no longer minimal in the situation of FIG. 3, what increases the power consumption of the motor relatively to the case of FIG. 2 because of the resistive heating losses which are greater. This is thus a non-optimal situation.

It is an object of the present invention to overcome the problem identified above for a motor of the type shown in FIG. 1 and controlled according to the preferred control method described before.

According to a first aspect of the invention, there is provided a direct current electric motor comprising:
- a rotor equipped with permanent magnets, the rotor being arranged to rotate continuously in a determined rotation direction;
- a first stator inductor characterised by first inductor parameters;
- a second stator inductor characterised by second inductor parameters;
- a voltage supply unit for providing a voltage supply to the first and second stator inductors for driving the rotor;
- an measurement unit for detecting time instants when a first induced voltage in the first stator inductor equals a second induced voltage in the second stator inductor;
- a control unit for controlling the application of drive voltage pulses by the voltage supply unit to the first and second stator inductors, wherein the rotor is arranged to first face the second stator inductor before facing the first stator inductor when being rotated in the determined rotation direction,
wherein at least one of the second inductor parameters is different from a corresponding parameter of the first inductor parameters such that a maximum induced voltage in the first stator inductor is greater than a maximum induced voltage in the second stator inductor, and wherein the control unit is arranged to trigger each drive voltage pulse after a detection, by the measurement unit, of an equal induced voltage in each of the first and second stator inductors.

According to an advantageous variant, the control unit is arranged to trigger the drive voltage pulses immediately after the detection of an equal induced voltage (i.e. detection of a crossing of the induced voltages in the two stator inductors).

According to an advantageous variant, the at least one of the second inductor parameters comprises at least one structural dimension of the second inductor.

The proposed solution has the advantage that the resistive heating losses can be minimised because the crossing point of the two induced voltages is located before the peak of the sum of these two induced voltages and thus the generated pulses are optimally located. In other words, the overall power consumption of the motor is minimised without however compromising the motor performance.

According to a second aspect of the invention, there is provided an electromechanical watch comprising the motor according to the first aspect of the present invention. According to a third aspect of the invention, there is provided a method of operating a DC electric motor as recited in claim 12.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
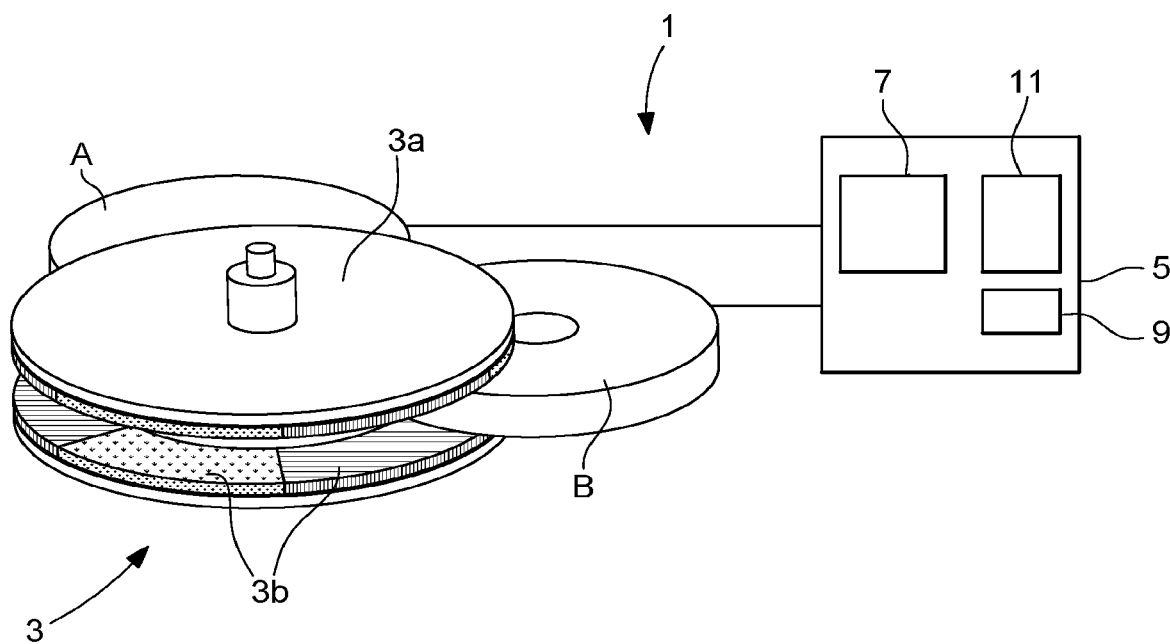
FIG. 1 illustrates in a simplified and schematic manner a DC electric motor where the teachings of the present invention may be applied.
Figure 2:
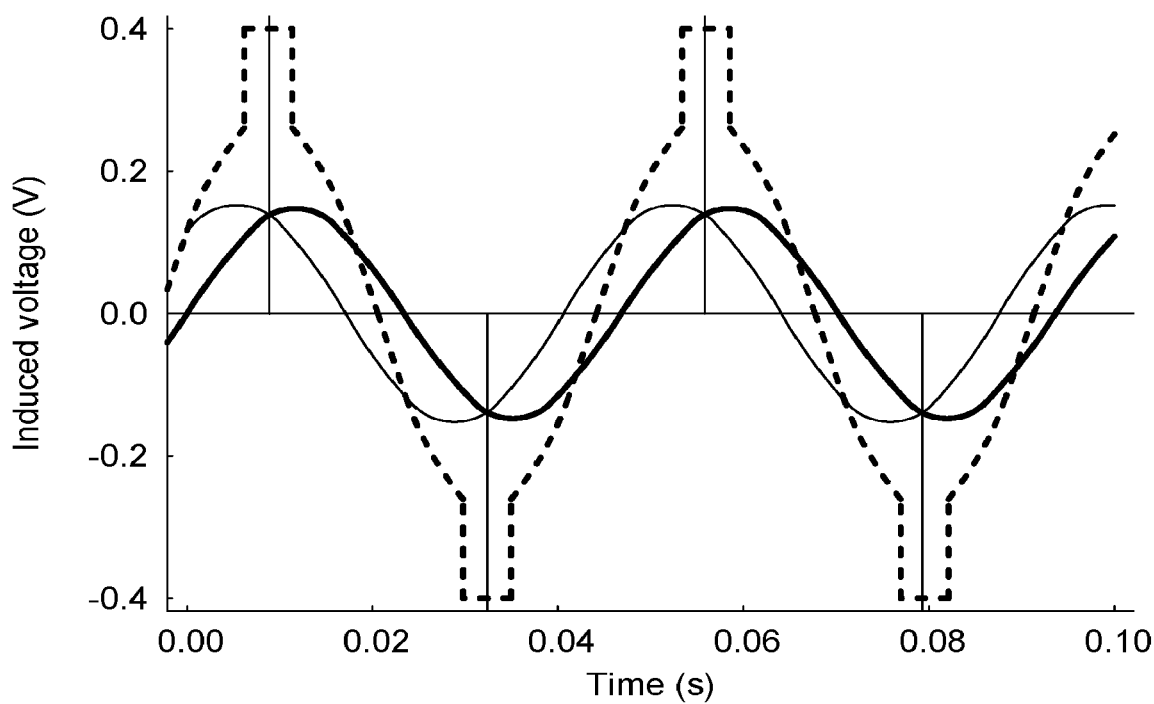
FIG. 2 shows the waveforms of the induced voltages in the inductors of FIG. 1 assuming that these inductors have substantially identical parameters and further shows an ideal location of the drive voltage pulses in this scenario.

An embodiment of the present invention will now be described in detail with reference to the attached figures. The invention will be described in the context of a continuous rotation DC electric motor of a watch, such as a wristwatch, comprising two stator inductors, where the rotor of the motor is equipped with bipolar permanent magnets. However, the teachings of the invention are not limited to this environment or application. Identical or corresponding functional and structural elements which appear in different drawings are assigned the same reference numerals. As utilised herein, "and/or" means any one or more of the items in the list joined by "and/or". The word "comprise" is interpreted by the broader meaning "include" or "contain".

The teachings of the present invention are next explained in more detail in the context of the motor of FIG. 1. The rotor is arranged to continuously rotate in a first direction but optionally also in a second, opposite direction. In the present example, the first and second stator inductors or coils A, B have a disc-shaped (circular) form with a central through hole (with no magnetic material in it). When used in wristwatches, an external diameter of each coil may be between 3 mm and 5 mm, while an internal diameter (of the central hole) may be between 0.5 mm and 1.5 mm. The internal diameter corresponds thus to the diameter of the central aperture. The inductors are in this example relatively flat and disc-shaped and have a thickness between 0.3 mm and 1 mm. The first and second inductors are at an angle $\alpha$ relative to each other. The angle $\alpha$ is here defined as the angle between a first imaginary line, passing through the axis of rotation of the rotor and the axis of rotation of the first inductor, and a second imaginary line passing through the axis of rotation of the rotor and the centre of the second inductor. In this example the angle ∝ is preferably 104° but it could instead be in an advantageous variant any value between 95° and 115° or more specifically between 100° and 110°. In the present embodiment, the rotor is equipped with six permanent magnets 3b, having an axial polarisation axis and alternate polarities, on each of its two ferromagnetic plates 3a and so that the angle ∝ is 104°. This leads to an electrical phase difference of 48° between the induced voltages in the inductors.

Figure 4:
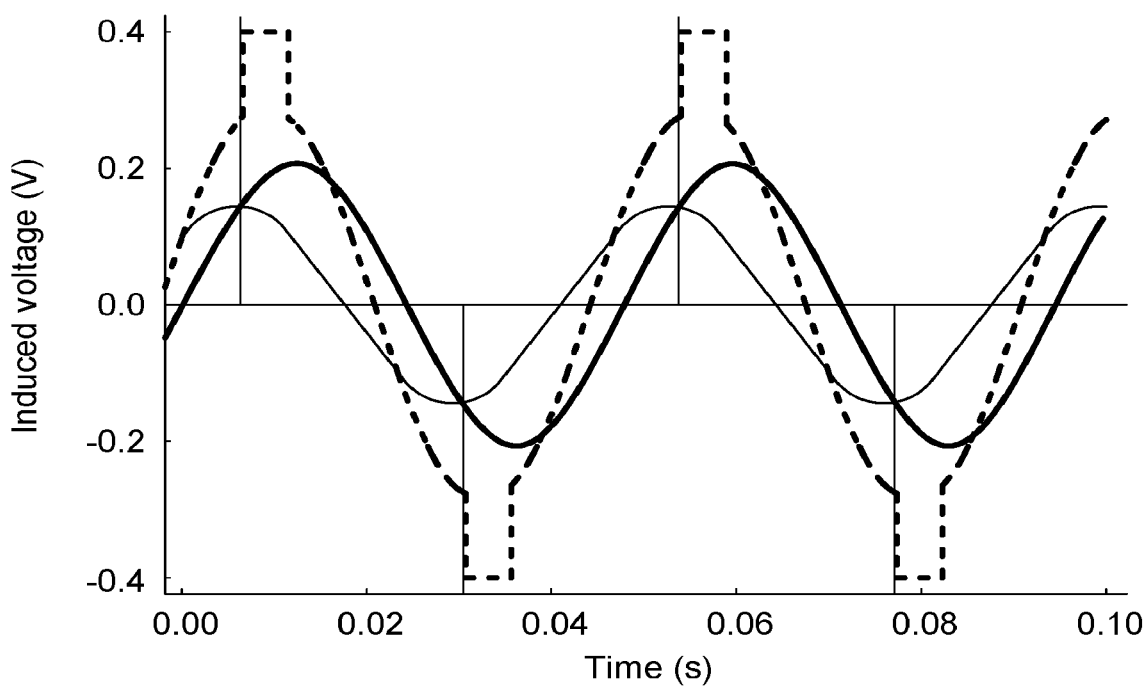
FIG. 4 shows the waveforms of the induced voltages in the inductors of FIG. 1 assuming that these inductors are asymmetrical (i.e. not identical parameters) and further shows, according to the invention, an optimal location of the drive voltage pulses with a preferred control method for the motor.

As explained above, the present invention aims to centre drive voltage pulses time wise substantially at the respective centres of absolute maxima of the sum of the induced voltages in the two motor stator inductors by keeping the preferred motor control method characterized by providing drive voltage pulses each after a detection of a crossing of the induced voltages in the two inductors. In practical terms, it is searched the minimum between the supply voltage and the sum of the two induced voltages averaged over the pulse duration: $\min(V_{bat} - \overline{V}_{ind}^{tot})$. This can be achieved by having asymmetrical induced voltages in the first and second inductors A, B such that each drive voltage pulse can be centred at an absolute maximum of the sum of the induced voltages. By 'absolute maximum', it is understood a maximum in absolute value. This ideal scenario is depicted in FIG. 4. In this scenario, the peak induced voltage value in the second inductor B (thin solid line) is lower than the peak induced voltage value in the first inductor A (thick solid line) so that a crossing point of the induced voltages is located before (in the time domain) an absolute maximum of the sum of the induced voltages. Advantageously the beginning of each drive voltage pulse is located substantially immediately or a very short time duration after a crossing point. This time duration corresponds to the delay required to change the state of the switches of the motor drive unit 5. This delay may be between 400 μs and 800 μs. It is to be noted that the crossing of the induced voltages in the two stator inductors/coils can be detected by a comparator arranged within the measurement unit 11.

Figure 3:
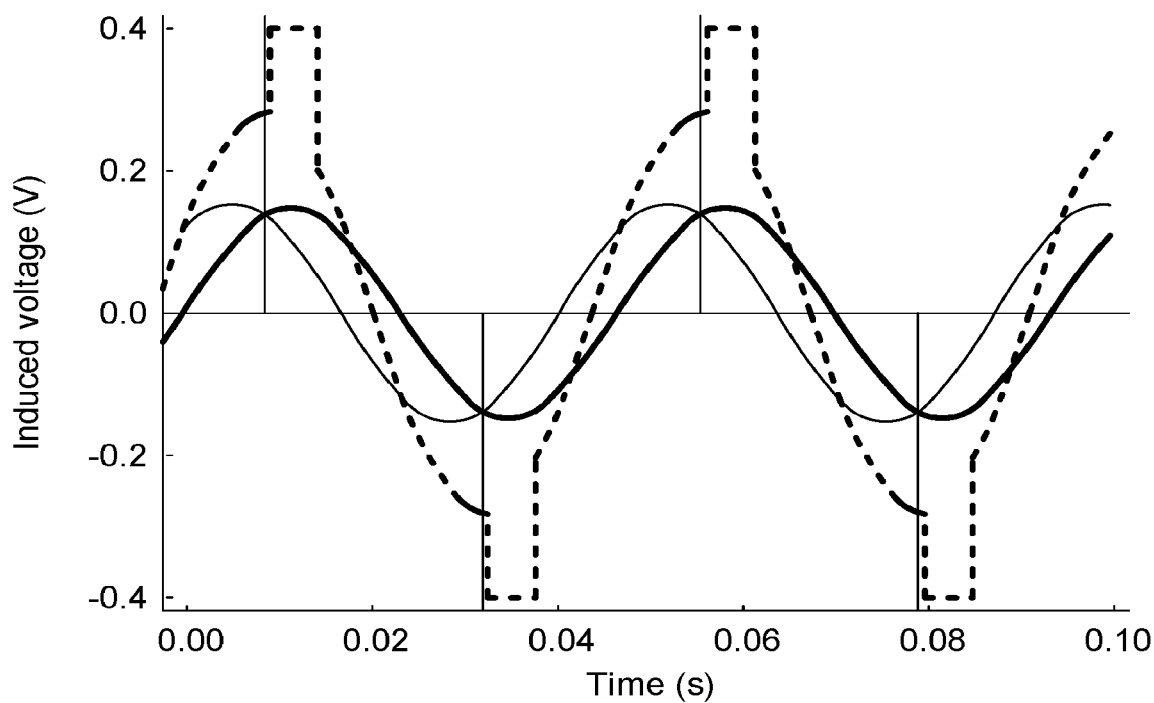
FIG. 3 shows the waveforms of the induced voltages in the inductors of FIG. 1 assuming that these inductors have substantially identical parameters and further shows a non-optimal location of the drive voltage pulses resulting from a preferred control method for the motor.
Figure 5:
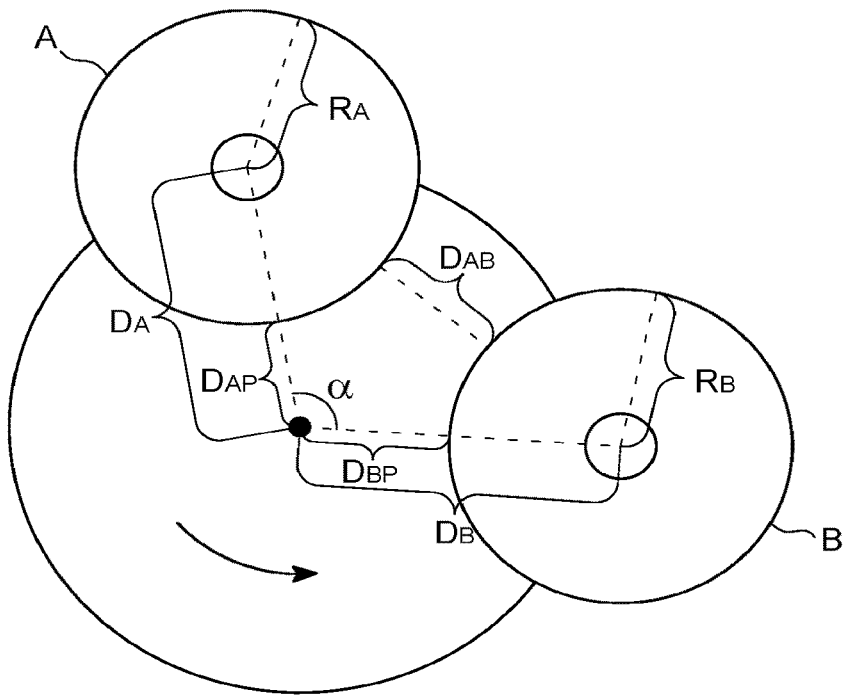
FIG. 5 shows a schematic rotor-stator configuration according to the solution of FIG. 2 or 3.

To achieve the asymmetrical induced voltages, the present invention proposes a solution in which the two inductors A and B are no longer symmetrical or identical. In other words, the two inductors A and B are asymmetrical with respect to at least one inductor parameter. FIG. 5 schematically illustrates a rotor-stator configuration comprising two identical stator inductors. This configuration may be considered to be ideal when the two inductors are identical. However, this situation leads to a situation depicted in FIG. 3, in which the generated voltage pulse is not centred at the maximum of the sum of the induced voltages in the first and second inductors. The following notations are used:

$D_A$ denotes the distance between the centre of the first inductor A and the centre of the rotor;

$D_B$ denotes the distance between the centre of the second inductor B and the centre of the rotor;

$D_{AP}$ denotes the smallest distance between the periphery of the first inductor A and the centre of the rotor;

$D_{BP}$ denotes the smallest distance between the periphery of the second inductor B and the centre of the rotor;

$D_{AB}$ denotes the smallest distance between the peripheries of the first and second inductors A, B;

$R_A$ denotes the radius of the first inductor A; and $R_B$ denotes the radius of the first inductor B.

In order to reduce power consumption and thus to approach the ideal situation, in which the pulse is centred at the absolute maximum of the sum of the induced voltages, according to the present invention at least one inductor parameter of at least one of the inductors is modified compared to the situation shown in FIG. 5 which defines a starting point for the configuration of the two coils according to the invention. The first inductor A is characterised by first inductor parameters, while the second inductor B is characterised by second inductor parameters. Thus, according to the present invention at least one of the second inductor parameters is different from at least one corresponding parameter of the first inductor parameters such that in a given rotation direction of the rotor, the rotor faces first the second inductor before facing the first inductor and such that the maximum induced voltage in the first inductor is larger than the maximum induced voltage in the second inductor. The measurement unit 11 is arranged to detect time instants when the induced voltage in the first inductor A equals the induced voltage in the second inductor B and to instruct the drive unit 5 accordingly. The drive unit 5 is arranged to trigger the voltage pulses after the detection, by the measurement unit, of an equal induced voltage in each of the first and second inductors A, B.

The first and second inductor parameters comprise at least one of the following parameters: coil wire diameter, number of wire turns, coil thickness, coil external diameter and coil internal diameter (or the central hole), as well as and the coil position (distance of its centre or periphery from the rotation axis of the rotor). It is to be noted that the inductor diameters may or may not be constant throughout the thickness of the inductor. If the coil's cross section is not substantially circular, the diameter could be replaced for instance with a largest cross-sectional dimension. Thus, in view of the above, at least one parameter, which is according to the invention different between the first inductor A and the second inductor B, may be a given structural dimension of the inductors.

Figure 6:
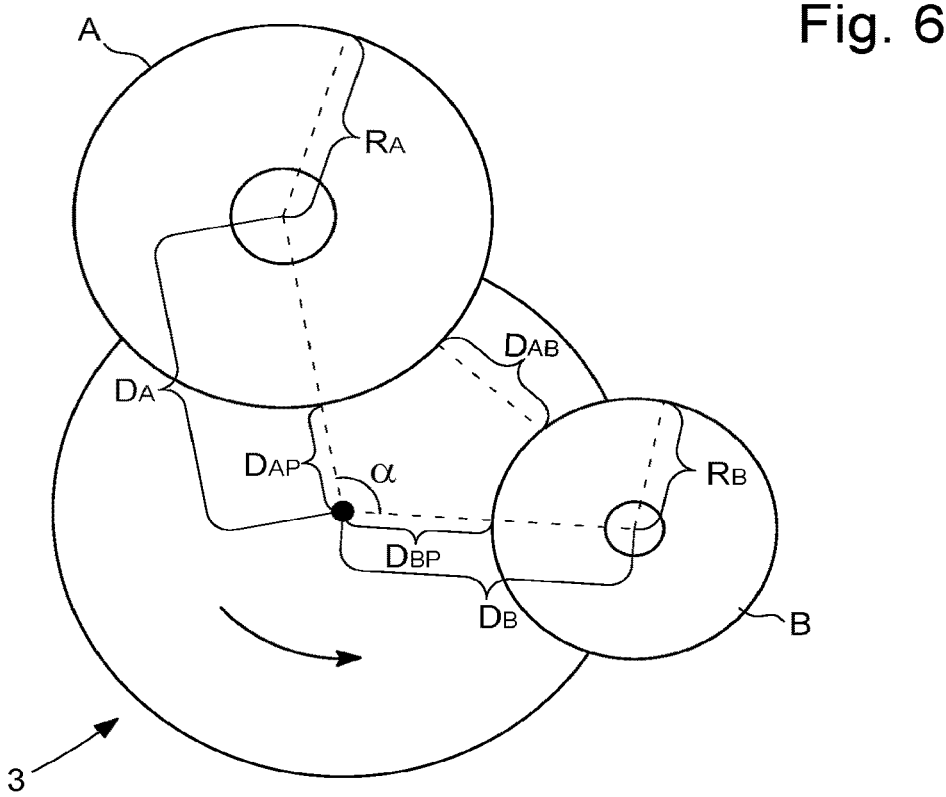
FIG. 6 shows a schematic rotor-stator configuration according to an example of the present invention.

FIG. 6 illustrates a rotor-stator configuration, in which the external radius $R_A$ of the first inductor A has been made greater compared to the situation of FIG. 5. Furthermore, the external radius $R_B$ of the second inductor B has been made smaller, the first inductor A has been repositioned (the centre moved away from the rotor) and the second inductor B has also been repositioned (the centre moved closer to the rotor) in order to keep the parameters $D_{AB}$, $D_{AP}$, $D_{BP}$ and ∝ substantially constant between the configurations of FIGS. 5 and 6. However, it is not necessary to keep all the parameters constant when moving from the configuration of FIG. 5 towards an optimal situation according to the invention. In one example configuration, $D_{AB}$ substantially equals $D_{BP}$, which equals $D_{AP}$. In view of the above, if one inductor parameter of one of the inductors is altered, then this may lead to modifying at least one parameter of the other inductor. In one example, only one inductor parameter of one of the inductors is modified, namely one of the distances $D_A$ or $D_B$, when moving from the configuration of FIG. 5 towards the ideal situation. This means that the angle ∝ may be kept constant when moving from the configuration of FIG. 5 towards an ideal situation.

Figure 7:
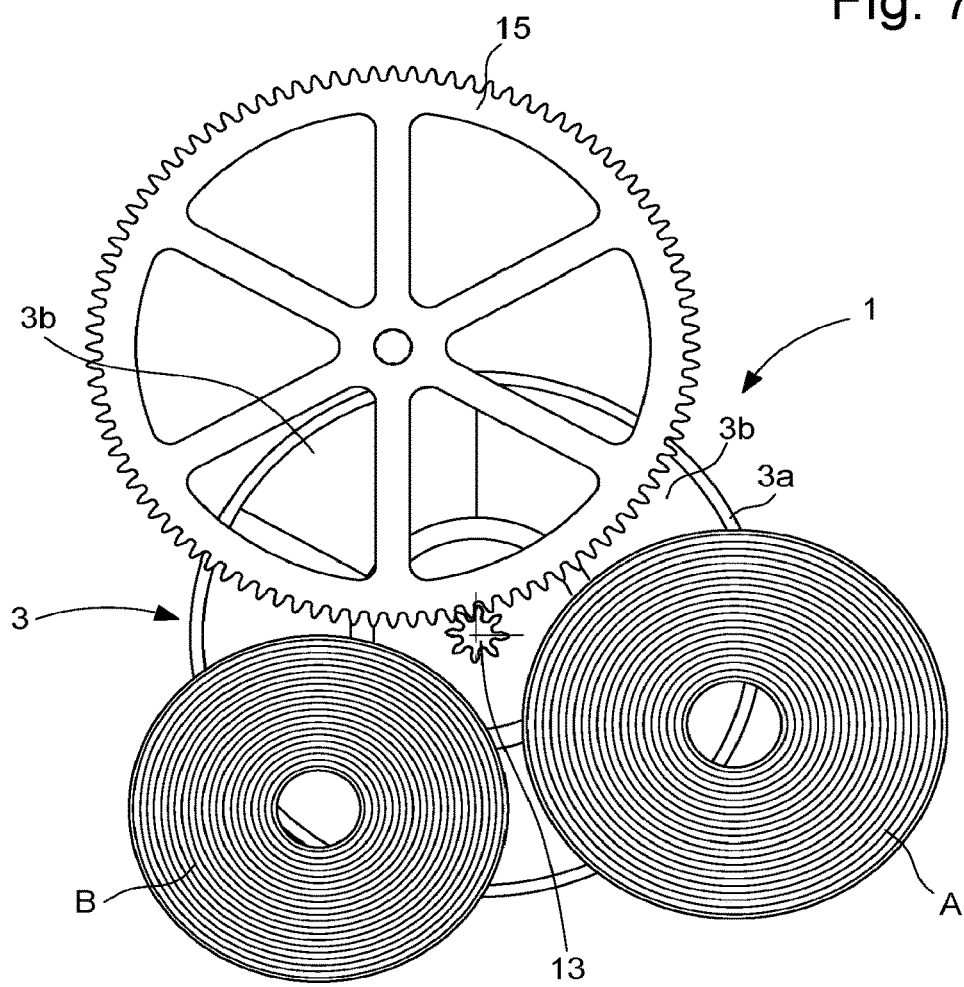
FIG. 7 schematically shows an example practical implementation of a rotor-stator configuration according to FIG. 6.

However, when modifying at least one inductor parameter of the first or second inductor(s), certain tolerances have to be respected. These tolerances are due to the practical implementation of the motor 1 as illustrated in FIG. 7. As shown in FIG. 7, a pinion 13 is provided at the centre of the rotor and occupies a first surface area (circular surface area) with a given diameter. The pinion is arranged to mesh with a wheel 15, which occupies a second surface area which is a given angular section of the surface area of the rotor (when seen from above). Thus, under no circumstances are the first and second inductors A, B allowed to penetrate the first and second surface areas. This means that the values of the parameters $D_{AP}$ and $D_{BP}$ are greater than the radius of the pinion and that the angle ∝ between the two inductors may have a maximal allowed value. Furthermore, a certain minimum distance may be defined between the first and second inductors A, B. Thus, in view of the above, it is possible to set minimum distances between the rotor and the first inductor on the one hand, and between the rotor and the second inductor on the other hand. Furthermore, the angle ∝ between the two inductors may have a maximal allowed value.

Figure 8:
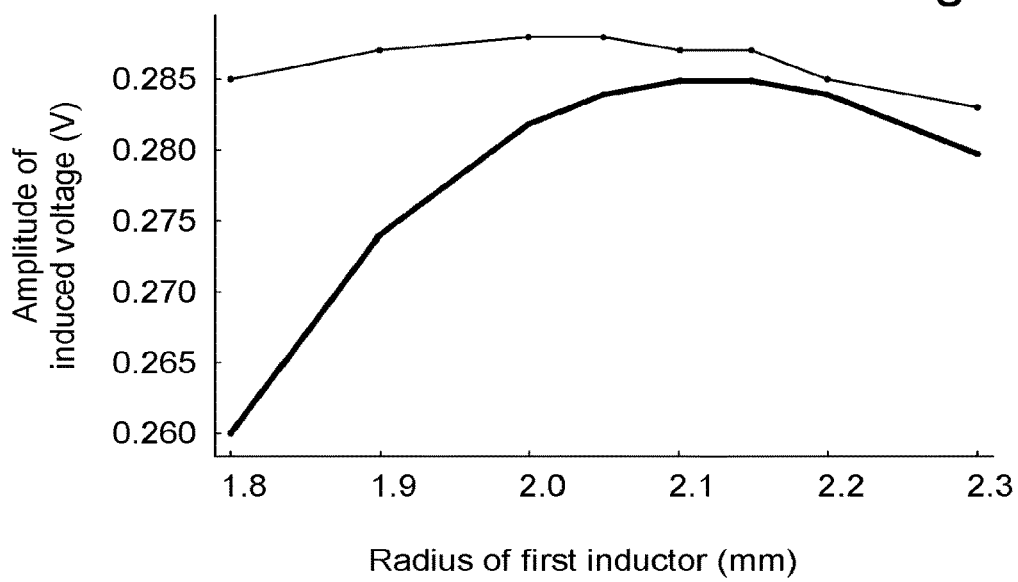
FIG. 8 shows the curve of a sum of induced voltages averaged over the pulse duration as a function of the radius of a first inductor and further shows the curve of a maximum of the sum of these induced voltages as a function of the radius of the first inductor.

The upper (thin) curve in FIG. 8 shows the maximum of the sum of the induced voltages $V_{ind}^{tot}=V_A+V_B$ in the inductors as a function of the radius of the first inductor A. In this example, the radius of the second inductor B is kept constant and is 2.0 mm. It can be noticed that the maximum of that upper curve corresponds to a symmetrical inductor configuration, in which the two inductors have the same dimensions and are positioned at an equal distance from the rotor 3.

The lower (thick) curve in FIG. 8 shows the sum of the induced voltages averaged over the pulse duration as a function of the radius of the first inductor A. It can now be noticed that the maximum value corresponds to an asymmetrical situation, in which the first and second inductors are not identical. In this example, the external radius of the first inductor A is greater than then the external radius of the second inductor B, as also shown in FIG. 6. This configuration thus minimises the difference $V_{bat}-\overline{V}_{ind}^{tot}$, where $V_{bat}$ is the supply voltage and $\overline{V}_{ind}^{tot}$ is the average value of the sum of the induced voltages in the two inductors over a drive pulse duration.

It is to be noted that in the above description, the peak induced voltage in the first inductor A was greater than the peak induced voltage in the second inductor B (see FIG. 4). Furthermore, in a given normal rotation of the rotor, a given radius reaches first the second inductor B (smaller induced voltage) and after that the first inductor A (greater induced voltage). In other words, in a normal rotation of the rotor, a given magnet of the rotor is first aligned with the second inductor and only after having rotated more (in this example counter-clockwise), it becomes aligned with the first inductor. If the rotor were to be rotated in the opposite direction, then the crossing point of the induced voltages would be located timewise after the peak of the sum of the induced voltages. This would mean that the drive pulse to be generated would be located offset with respect to the centre of the peak of the sum of the induced voltages, what is contrary to the present invention.

Furthermore, in the above example, the pulse was generated substantially immediately after the crossing of the induced voltages was detected. However, it is possible to trigger the pulse after a given delay. For this purpose, a timer may be used such that the time starts to run when a voltage crossing has been detected and a pulse is triggered once the timer has expired. The delay may then be taken into account when designing the inductors. More specifically, the greater the delay, the more the two inductors differ from each other.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

The invention claimed is:

1. A direct current electric motor comprising:
a rotor equipped with permanent magnets, the rotor being arranged to rotate continuously in a determined rotation direction;
a first stator indictor characterized by second inductor parameters;
a second stator inductor characterized by a second inductor parameters;
a voltage supply unit for providing a voltage supply to the first and second stator inductors for driving the rotor;
a measurement unit for detecting time instants when a first induced voltage in the first stator inductor equals a second induced voltage in the second stator inductor;
a control unit for controlling the application of drive voltage pulses by the voltage supply unit to the first and second stator inductors, wherein the rotor is arranged to first face the second stator inductor before facing the first stator inductor when being rotated in the determined rotation direction; wherein at least one of the second inductor parameters is different from a corresponding parameter of the first inductor parameters such that a maximum induced voltage in the first stator inductor is greater than a maximum induced voltage in the second stator inductor, and wherein the control unit is arranged to trigger each drive voltage pulse after a detection, by the measurement unit, of an equal induced voltage in each of the first and second stator inductors.

2. The motor according to claim 1, wherein the control unit is arranged to trigger the drive voltage pulses each immediately after the detection of an equal induced voltage.

3. The motor according to claim 1, wherein at least one of the second inductor parameters comprises at least one structural dimension of the second inductor.

4. The motor according to claim 1, wherein the first and second inductors are each formed by a coil, and wherein at least one of the second inductor parameters comprises at least one of the following parameters: a coil wire diameter, a number of wire turns, a coil dimension and a radial coil position with respect to an axis of rotation of the rotor.

5. The motor according to claim 1, wherein a first distance defined as a minimal distance between a centre of the rotor and an outer edge of the first stator inductor substantially equals a second distance defined as a minimal distance between the centre of the rotor and an outer edge of the second stator inductor.

6. The motor according to claim 5, wherein the first distance and the second distance are substantially equal to or greater than a third distance defined as a distance between the peripheries of the first stator inductor and the second stator inductor.

7. The motor according to claim 1, wherein the control unit is arranged to apply the drive voltage pulses so that the drive voltage pulses are substantially centred at an absolute maximum of a sum of the induced voltages in the first and second inductors.

8. The motor according to claim 1, the first and second inductors are at an angle ∝ relative to each other, the angle ∝ being defined as the angle between a first imaginary line, passing through the axis of rotation of the rotor and the centre of the first inductor, and a second imaginary line passing through the axis of rotation of the rotor and the second inductor, and wherein the angle ∝ is between 95° and 115°.

9. The motor according to claim 1, wherein the first and second inductors are disc-shaped such that the external diameter of each one of the inductors is greater than the thickness of each one of the inductors.

10. The motor according to claim 1, wherein the first and second inductors are connected in a series configuration during the drive voltage pulses.

11. An electromechanical watch comprising the motor according to claim 1.

12. An electromechanical watch comprising the motor according to claim 4.

13. A method of operating a direct current electric motor comprising:
 a rotor equipped with permanent magnets, the rotor being arranged to rotate continuously in a determined rotation direction;
 a first stator inductor characterized by second inductor parameters;
 a second stator inductor characterized by a second inductor parameters;
 a voltage supply unit for providing a voltage supply to the first and second stator inductors for driving the rotor;
 a measurement unit for detecting time instants when a first induced voltage in the first stator inductor equals a second induced voltage in the second stator inductor;
 a control unit for controlling the application of drive voltage pulses by the voltage supply unit to the first and second stator inductors, wherein the rotor is arranged to first face the second stator inductor before facing the first stator inductor when being rotated in the determined rotation direction; wherein at least one of the second inductor parameters is different from a corresponding parameter of the first inductor parameters such that a maximum induced voltage in the first stator inductor is greater than a maximum induced voltage in the second stator inductor, and wherein the control unit is arranged to trigger each drive voltage pulse after a detection, by the measurement unit, of an equal induced voltage in each of the first and second stator inductors.

14. The method according to claim 13, wherein the drive voltage pulses are triggered immediately after the detection of an equal induced voltage.

15. The method according to claim 12, wherein the drive voltage pulses are applied so that these drive voltage pulses are centred at an absolute maximum of a sum of the induced voltages in the first and second inductors.

\* \* \* \* \*